Dec. 10, 1968   J. R. BEDFORD, JR   3,415,946
SIMULATED VISUAL INSTRUMENT-APPROACH SYSTEM
Filed Aug. 13, 1965   3 Sheets-Sheet 1
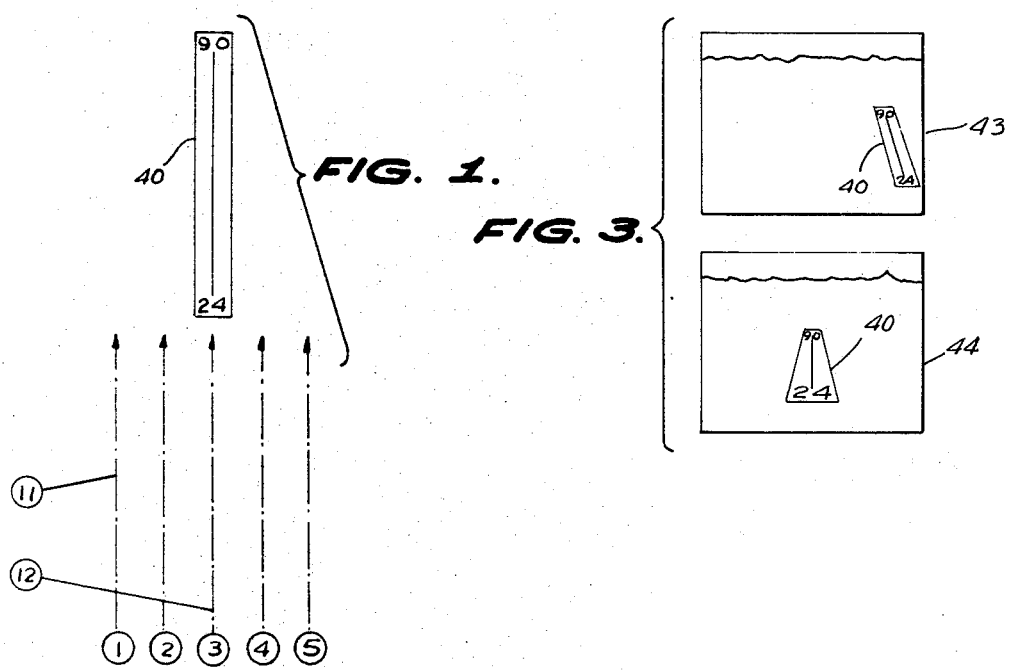
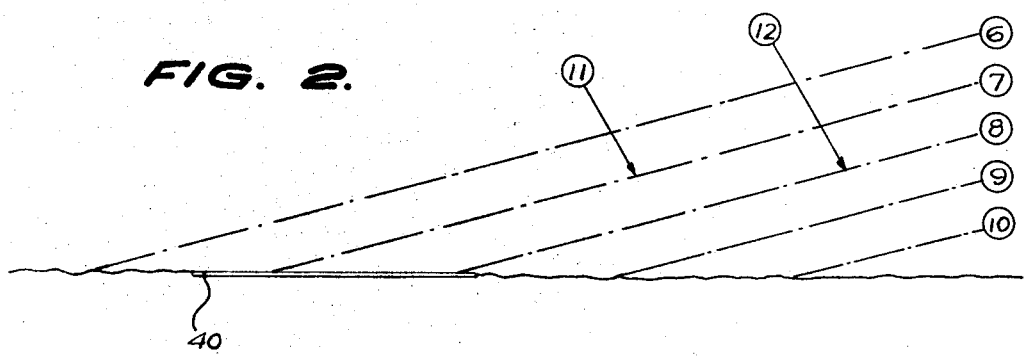
INVENTOR.
JAMES R. BEDFORD, JR.
BY
Berman, Davidson & Berman
ATTORNEYS.

Dec. 10, 1968 J. R. BEDFORD, JR 3,415,946
SIMULATED VISUAL INSTRUMENT-APPROACH SYSTEM
Filed Aug. 13, 1965 3 Sheets-Sheet 2

INVENTOR.
JAMES R. BEDFORD, JR.
BY
Berman, Davidson & Berman
ATTORNEYS.

Dec. 10, 1968   J. R. BEDFORD, JR   3,415,946
SIMULATED VISUAL INSTRUMENT-APPROACH SYSTEM
Filed Aug. 13, 1965   3 Sheets-Sheet 3
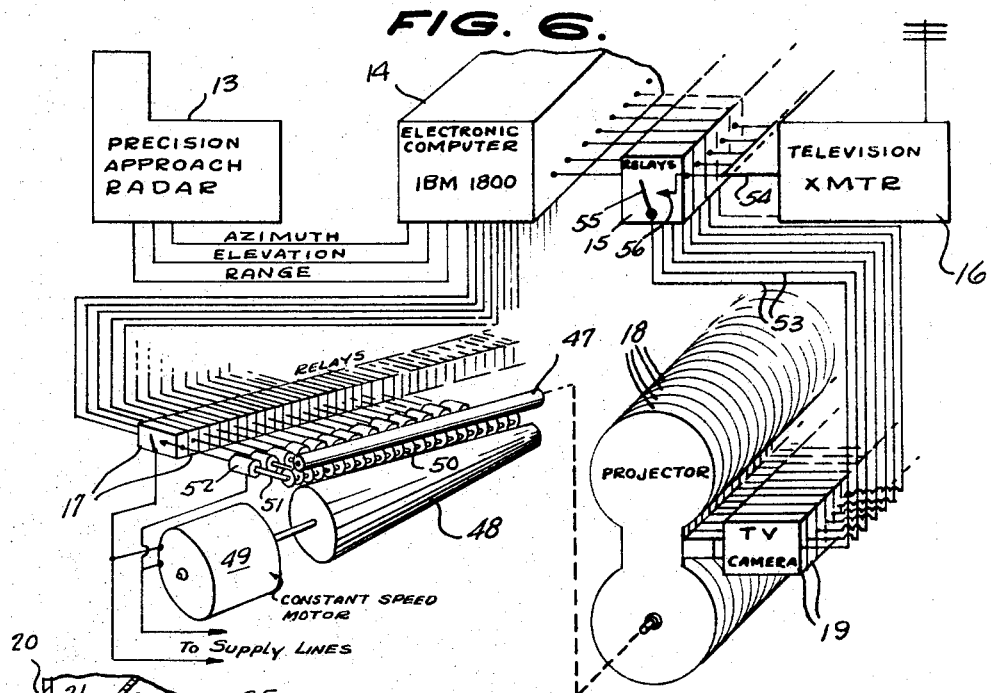
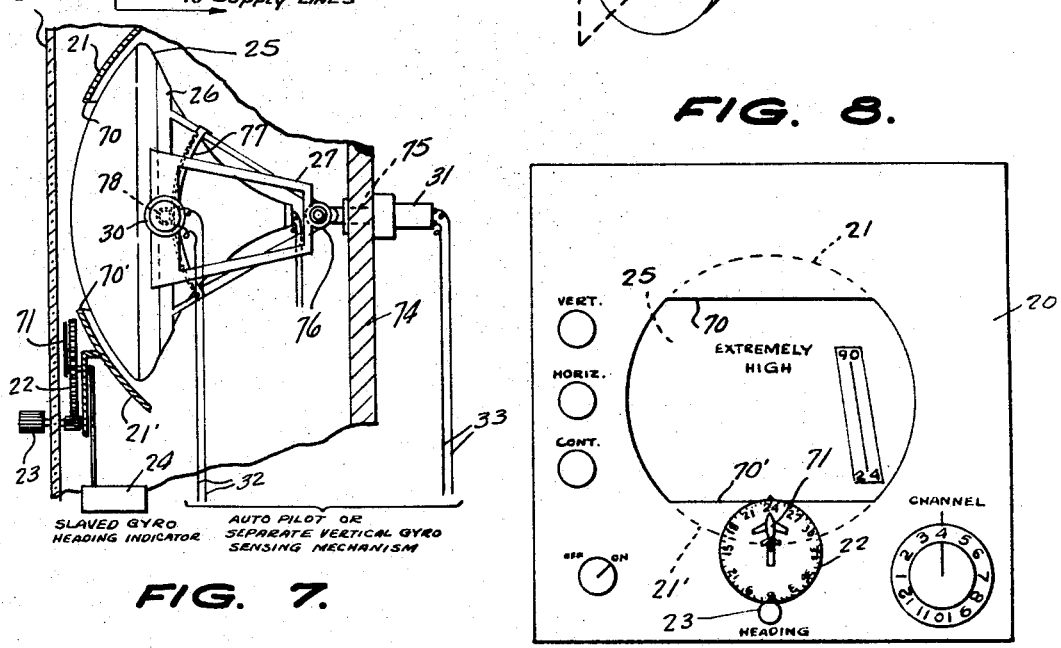
INVENTOR.
JAMES R. BEDFORD, JR.
BY
Berman, Davidson & Berman
ATTORNEYS.

United States Patent Office 3,415,946
Patented Dec. 10, 1968

3,415,946
SIMULATED VISUAL INSTRUMENT-
APPROACH SYSTEM
James R. Bedford, Jr., 1714 W. Jackman,
Lancaster, Calif. 93534
Filed Aug. 13, 1965, Ser. No. 479,367
18 Claims. (Cl. 178—6.8)

ABSTRACT OF THE DISCLOSURE

Simulated visual instrument-approach system for an airfield. Pictures of the airfield taken from various sectors of the approach zone are provided. A particular picture is selected in accordance with the radar-detected range, azimuth and elevation information from an approaching aircraft. The selected pictures are exposed to video cameras and the cameras furnish video signals corresponding to the pictures to a transmitter. The selected video signals are received by a television receiver on an aircraft approaching the airfield and provide views of the airfield in accordance with the zonal positions of the aircraft.

---

This invention relates to aircraft instrument landing systems, and more particularly to a system for providing the pilot of an aircraft with a view of the approach to a landing field by television substantially the same as it would appear to him under normal daylight visual conditions.

A main object of the invention is to provide a novel and improved automatic system for providing a pilot approaching an airfield with a television picture of the airfield and the region adjacent thereto substantially the same as it would appear visually under usual daylight conditions, the system employing easily obtainable components, being automatic in operation after being activated so that it does not thereafter require an operator to constantly monitor the approach of the aircraft and give voice directions to the pilot, and providing the pilot with an accurate visual indication of his position relative to the airfield runway, thereby enabling him to immediately make any necessary corrections.

A further object of the invention is to provide an improved system for providing a pilot approaching an airfield with an accurate picture of the airfield and regions adjacent thereto by television as seen from the actual position of the aircraft under normal clear visual daylight conditions, the system providing the pilot with an accurate view of all natural and man-made obstructions on or adjacent to the approach to the airfield under conditions where a normal view of the airfield and regions adjacent thereto cannot be obtained, for example, while flying in clouds or at night, the system being entirely automatic in operation and being self-compensating for different positions or attitudes of the aircraft, enabling a pilot to make a safe approach to an airfield with attention being required to relatively few instruments, enabling safe approaches to be made by pilots, even with limited instrument flying experience, and providing all necessary ground-to-air communications visually on a television screen.

A still further object of the invention is to provide an improved television system for providing the pilot of an aircraft with an accurate view on a television screen of his approach path toward the runway of an airfield substantially exactly as it would appear under normal daylight viewing conditions and enabling the pilot to make any necessary corrections as to the direction and position of his aircraft to provide a safe landing, the system involving relatively inexpensive components, being reliable in operation, and automatically adjusting itself in accordance with the location and speed of the aircraft in the operating zone of the system, whereby safe landings can be made under conditions of low ceiling and/or low visibility conditions by relatively unskilled pilots.

A still further object of the invention is ot provide an improved system for providing the pilot of an aircraft with a television picture simulating what he would actually see when approaching an airfield under normal daylight viewing conditions, the system automatically taking into account all the various flight factors, such as the direction and speed of the aircraft, the attitude and position of the aircraft, and other factors involved in successfully maneuvering the aircraft to provide a safe landing.

Further objects and advantages of the invention will become apparent from the following description and claims, and from the accompanying drawings, wherein:

FIGURE 1 is a diagram illustrating a series of horizontally-spaced flight paths parallel to an airfield runway which an aircraft might assume in approaching the runway.

FIGURE 2 is a diagram illustrating a series of vertically-spaced approach paths which an aircraft might assume in approaching the airfield runway.

FIGURE 3 is a diagram illustrating the appearance of the runway as it might be presented to a pilot in two possible combinations of horizontally- and vertically-spaced flight paths from FIGURES 1 and 2.

FIGURE 4 is a diagram showing the zonal distribution of pictorially-represented information available on the television screen of an aircraft operating with a simulated ground-display system according to the present invention.

FIGURE 5 is a diagram showing, in plan, a horizontal row of possible aircraft flight paths approaching an airfield runway and illustrating one position of the azimuth scanning beam of the radar apparatus associated with the system of the present invention and illustrating the method of obtaining the information necessary for programming the computer associated with the system so that it will select the proper pictorially-filmed information necessary to be transmitted to the approaching aircraft for display on the television screen.

FIGURE 6 is a block diagram schematically illustrating a typical aircraft-sensing and television picture-transmitting apparatus employed in a system according to the present invention.

FIGURE 7 is a fragmentary longitudinal vertical cross-sectional view taken through the viewing apparatus provided on an aircraft in a television landing system according to the present invention.

FIGURE 8 is a front elevational view of the television viewing panel associated with the apparatus of FIGURE 7.

When the pilot of an aircraft intends to land at an airport under conditions of weather which are relatively unfavorable and which are such as to cause less than established safe conditions of cloud height and visibility, he is required to make an instrument approach.

An instrument-approach is divided into two phases; the initial approach, and the final approach. The first phase, or initial approach, is for the purpose of positioning the aircraft at a predetermined point and altitude, which is of the order of eight to ten miles from the end of the runway and one-thousand feet or more above the ground, and to have the aircraft heading in the same general direction as the runway on which the landing is to be made. The second, or final-approach phase, is from this predetermined point to the minimum altitude the aircraft is allowed to descend to on the approach to the runway, unless the pilot establishes visual contact with the runway to make the landing.

In accordance with conventional practice, the initial approach is usually made in one or two ways. The air traffic controller can instruct the pilot to make the approach in accordance with charts published for that purpose, or radar-air-traffic control can give voice instructions to the pilot for changes in direction and altitude. Both methods have the same end results, namely, that of positioning the aircraft for the final approach.

There are two common types of final approaches. One is the so-called "instrument landing system" (ILS), and the other is the "ground controlled approach" (GCA).

The ILS is a system whereby two directional radio beams are transmitted out along the approaches to the runway on which it is installed. One of these beams is a course beam known as the "localizer," and the other is an elevation beam known as the "glide slope." An aircraft must have ILS equipment in order to use this type of approach. The information is presented to the pilot in the form of pointer indications on an instrument. A vertical pointer is the course-deviation indicator, and a horizontal pointer is the glide slope-deviation indicator. When either of the pointers is deflected from its center, or crossed position, the pilot maneuvers the aircraft in the direction of the deflection until the pointer is centered, and then resumes the proper heading or rate of descent.

The GCA system employs a radar set installed adjacent to the runway on which it is to be used. That portion of the set used for final approaches is called "precision approach radar" (PAR). Two radar beams are transmitted out along the approaches to the runway. One sweeps vertically, and the other horizontally. This is accomplished by moving the transmitting antennas through an arc of approximately 20° horizontally, and approximately 7° vertically. When the beam strikes an aircraft, it is reflected back to the transmitter. The angle of the antennas at the moment of the reflection is coupled with the time lapse from the moment of transmission until the reflection is received back at the radar unit, and from this, the azimuth, elevation and range of the aircraft are determined. This information is presented to an operator in the form of brilliant spots of light, or "pips" on a cathode ray tube. The face of the cathode ray tube is inscribed with cursor lines which represent the proper course and glide slope for the approach. The operator must observe the "pips" in relation to the cursor lines, decide what correction is necessary if the "pips" are not on the cursor line, and then transmit instructions to the pilot to make these corrections.

When a pilot makes a final instrument approach, he must monitor the air-speed indicator, heading indicator, attitude indicator, vertical-velocity indicator, altimeter, power settings, and the ILS instrument, if he is making an ILS approach. In the case of a GCA approach, he must monitor the voice instructions given by the ground controller. On either type of approach, he must apply the necessary course and glide-slope corrections by maneuvering the aircraft so as to get a different indication on one or more of the instruments mentioned. It will, therefore, be readily apparent that the tasks required in making these approaches taxes the pilot practically to the limit of his capabilities. Many aircraft accidents, with heavy loss of life and property, have been directly attributed to pilots becoming confused and disoriented during an instrument approach. Many other accidents have been probably caused by this, although there is no conclusive proof available thereof. This type of accident has occurred not only with pilots of relatively limited experience, but also with pilots considered to possess the highest skill.

The system of the present invention is one which permits an airplane pilot to make a landing approach under adverse weather conditions or at night, with substantially the same visual reference which he would have in clear daylight. Thus, the net effect of the system of the present invention is, for all practical purposes, the same as clearing away all clouds from the final approach and the airfield, and/or casting full daylight on the ground.

Basically, the system of the present invention employs four major ground-installed components, namely, "precision approach radar" (PAR), an electronic computer, a plurality of film projectors with television cameras for pick-up of the film projections, and a television transmitter.

The airborne component is a television receiver. As will be presently described, the television receiver is similar to a standard type of television receiver modified to provide a picture which closely simulates the view provided by an actual visual approach. The modifications include means to make the picture tube movable so as to present a picture in the same relationship as the ground when the aircraft changes attitude in pitch and/or roll, and the addition of an aircraft-heading indicator adjacent the lower margin of the picture tube. Other minor modifications will be presently described.

Secondary components of the system will be presently discussed in dealing with the operation of the system, as well as being illustrated in the drawings.

The system involves pre-recording views of the runway on photographic film or magnetic tape. (Photographic movie film will be used, as a typical picture-carrying medium, in the specific embodiment of the system to be described herein.) These views will be made from an aircraft flying a series of final approaches during clear daylight conditions with the camera sighted along the line-of-sight as through the aircraft's windshield. One of these approaches will be made in proper alignment with the runway and on the proper glide slope. All others will be left or right, higher or lower, and/or combinations thereof. The incorrect approach views will be made parallel to the correct one in both lateral and vertical displacement. These pre-recorded films are used in the projectors mentioned above.

In operation, the system functions as follows: When a pilot completes the initial-approach phase of an instrument approach, his aircraft is within the area of coverage of the PAR azimuth and elevation radar beams. The PAR "fixes" its position in space by measuring the angle of azimuth, angle of elevation, and the range. In addition to presenting this information on the ground-controlled approach operator's (PAR) scope, it is also passed through the electronic computer. The first operation of the computer is to use the decreasing range information to calculate the ground speed of the approaching aircraft.

The computer is programmed to relate every combination of azimuth, elevation, and range (within the coverage arcs of the PAR antennas) to the particular film view which was made from that position in space, almost nearly to that position.

When the approaching aircraft arrives at a predetermined range from the runway, namely, the same range from which each of the films were made, the computer, having calculated the ground speed of the aircraft, gives a signal which starts the projectors at a drive speed corresponding to the speed of the aircraft. Thus, the film is projected to give a view of the approach from the predetermined range at which it starts to the runway touchdown point in the same span of time it takes the aircraft to cover the same distance. This is accomplished by the computer providing a signal to a motor-speed regulator, rather than direct to the projector motors. The computer monitors the range information throughout the approach, so that if there is a change in the speed of the aircraft, the projector-motor speed is changed accordingly.

The projectors with the pre-recorded, filmed approaches, are loaded with continuous film loops arranged so that the start of each film is a view of the runway from the same range. The projectors are started at the same time and are synchronized (mechanically or electronically). Each projector has a television camera pick-up which permits any one of the pre-recorded films to be transmitted instantly.

At the same time the projectors are started, the computer selects which of the films to transmit by the method mentioned above (the arrangement for determining information for programming the computer being diagrammatically shown in FIGURE 5). When the selection is made by the computer, a signal is given to a multiple-relay unit to energize a relay associated with a corresponding projector/camera unit, which contains the selected film. This will couple the camera viewing the selected film to the television transmitter and, therefore, that film will be transmitted.

The first action of a pilot making an approach with the system of the present invention will be to turn the pilot switch or knob of the television-receiver set to "on," select the channel designated for the airfield, and set the heading indicator to the magnetic heading of the runway on which the approach is to be made. (It will be noted that the heading-pointer needle, represented by the miniature aircraft in FIGURE 8, will point to the actual magnetic heading of the aircraft and will only point to the selected heading when the aircraft is turned to that heading.)

When the pilot arrives at the predetermined range previously mentioned, namely, at a point from eight to ten miles from the end of the runway, the television receiver will pick up the transmitted picture of the approach to the runway. The view will be the same, or nearly the same, as the pilot would obtain by viewing straight through the windshield under clear daylight conditions. If the runway is not straight ahead, it will be readily apparent, because the runway will appear displaced right or left of the center of the picture tube. The pilot will, in this case, turn the aircraft in the direction of the displacement until the heading pointer points to a position in line with, but prior to the beginning of the runway. Thus, the pilot need only to keep the miniature airplane heading pointer directed to the end of the runway, and he will arrive at that position. If, on arrival at said predetermined range, the aircraft is a large angle off from runway alignment, the picture presented to the pilot, after making a correction, would change to a lesser angle off, and finally, to an on-course view.

The proper glide slope is much more difficult to detect than proper lateral alignment in both simulated and actual visual conditions. The system of the present invention furnishes the pilot with additional information relative to glide slope. This may be accomplished by providing sound tracks recorded on the film to give the pilot audio information. As an example, one of the incorrect-approach films may have a sound track with a repeated voice reminder, such as, "high on glide slope." The equipment for providing this feature is the same as in ordinary commercial applications. Another method which may be used in addition to, or instead of the audio system, is to provide lettered information superimposed on the film being transmitted. (Symbols, such as arrows indicating the direction in which a correction should be made may be employed in place of or in addition to lettered information.) The visual auxiliary information may be provided in either of two ways. The films may contain the lettered information directly superimposed on the image carried on the photographs, or the computer may be programmed to cause pre-selected information to be transmitted along with the picture from a separate television camera. The supplementary information furnished to the pilot is not restricted to glide-slope information, but may also include instructions for lateral alignment or other information deemed pertinent, such as instructions to execute a missed approach when the aircraft arrives at the lowest altitude permissible, as established by aviation authorities.

The pilot's television receiver is so modified that the picture tube can be rotated right or left and moved vertically through a limited range of travel, as viewed by the pilot. The purpose of this feature is to keep the picture on the television screen in its true relationship to the ground when the aircraft is maneuvered in pitch and roll to make the necessary corrections as to proper course and glide slope. This is accomplished by utilizing the sensing of pitch and roll displacement derived from the auto-pilot vertical gyro equipment and applying this displacement to the picture tube by the use of auto-pilot type actuating and motion-sensing mechanisms. When the aircraft banks to the right, the picture tube is rotated to the left the same number of degrees, keeping the picture horizontal in the same manner as the real horizon. Since it is obvious that there is a limit to pitch-change presentation due to the diameter of the tube, the receiver is modified to give the best visual reference for pitch change within a limited number of degrees. This is accomplished by shielding the upper and lower portions of the picture tube from the pilot's vision so that when the nose of the aircraft is raised or lowered, the tube is moved down or up, respectively, bringing a portion of sky or ground into view that was previously hidden behind the shielded portion. The pitch changes necessary for making a normal approach are much less than the pitch-change capability of the picture tube, but since the limit of tube movement could be reached without showing further pitch change, a warning flag, or other indicator, may be provided which will be moved into view indicating that the limit has been reached. Aircraft not ordinarily having an auto-pilot would require the installation of gyro equipment for sensing pitch-and-roll displacement in order to use the television picture tube for attitude reference.

Referring to the drawings, and more particularly to FIGURES 1, 2 and 3, in FIGURE 1, the parallel lines numbered 1 to 5 represent course-line tracks in the same direction as the runway 40 of an airfield, and in FIGURE 2, the inclined-slope lines numbered 6 to 10 represent vertically-spaced parallel glide slopes approaching the runway 40. In a typical system according to the present invention, five course-line tracks, such as are represented in FIGURE 1, and five glide-slope tracks, such as are represented in FIGURE 2, are combined to provide twenty-five filmed approaches to the airstrip runway 40, the twenty-five approach zones being contained in a rectangle 42 shown in FIGURE 4. As will be readily apparent, twenty-five zones are employed merely for illustrative purposes, and in practice any suitable number of approach zones may be employed.

FIGURE 3 represents two approximate views which would appear on single frames of movie film, the view shown at 43 being that which would be obtained in the approach zone determined by the combination of the course line 1 of FIGURE 1 and the slope line 7 of FIGURE 2, these tracks being identified by the corresponding numeral 11 in both FIGURES 1 and 2. The picture frame 43 shows the runway 40 considerably askew with respect to the forward direction of movement of the aircraft.

In contrast, the view 44 of FIGURE 3 is the resultant view obtained by the combination of the course line 3 of FIGURE 1 which is aligned with the runway 40, and the glideslope path 8 of FIGURE 2, which is directed toward the beginning of the runway, these paths being respectively designated by the similar numeral 12 in FIGURES 1 and 2. The frame 44 thus shows the landing runway 40 properly aligned with the direction of movement of the aircraft and indicates the proper glide slope necessary to properly approach the runway for a safe landing.

From the above discussion, it will be readily apparent that each filmed approach must represent the view along the centerline of each of the respective zones shown at 45 in FIGURE 4, making up the general pyramid-shaped volume 46 whose base comprises a rectangular area 42. Thus, each film must represent a square or rectangular area of space, when viewed down the glide slope, extending from the start of the film to the ground. This area would be from the actual course line/glide slope center of each film, halfway to the centerline of the adjacent film. As above-mentioned, the space represented by each filmed approach has definite coordinates, and these are programmed into the associated computer, having no direct bearing on the area of coverage on the photographic images. This will be more clearly seen with reference to FIGURE 5, presently to be discussed.

The pyramid-shaped volume shown at 46 in FIGURE 4 represents the limits of the PAR beam scans. The sectors or zones shown at 45 would have generally the same dimensions throughout the approach path. It is apparent that an aircraft making an approach in any one of the endmost right-hand zones 45 would fly out of the limits of radar scanning unless a correction to the left was made. This is the situation wherein audio/visual information would be transmitted to the pilot to warn him when this condition was about to occur. As an example, the film could be lettered or the computer programmed so that during the last mile of distance traveled before the aircraft actually flew out of radar scan limits, a suitable warning would be transmitted visually and/or orally, such as "Approaching Radar Limits—Execute Missed Approach."

FIGURE 6 schematically illustrates the ground-installed components of the system. Designated at 13 is a ground-controlled approach radar unit (GCA). The precision approach radar (PAR) portion of the unit is incorporated into the simulated visual instrument approach system of the present invention. Azimuth, elevation and range signals are taken from the PAR component of the unit 13 and furnished to the computer 14, no modification of the GCA unit 13 being required, so that it can operate in its normal manner and can perform its normal functions.

The computer 14 may be disposed in any suitable location and may be a conventional commercially-available apparatus similar to the IBM No. 1800 Computer, which is a relatively well-known apparatus. This computer will easily handle the requirements of the system of the present invention, having been previously employed in generally similar applications, for example, in taking radar azimuth and elevation information and relating it to the precise aiming of a missile-tracking camera. The system of the present invention utilizes the read-out of the computer for the activation of relays, which is easily within the range of capability of the above-mentioned IBM computer. Also, the computer derives information for controlling the projector drive speed, as will be presently described by comparing the radar return time on each second sweep of the precision approach radar antenna (employing either the azimuth or elevation antenna). Since the antenna scans at a constant time rate, the ground speed of the approaching target (aircraft) can be computed from the decreasing time of the radar returns. It is necessary to use each second radar return, rather than every radar return, since the time interval between the returns will not be constant if the aircraft were displaced from the exact center of the scanning range. In other words, a complete cycle of scanning is required to accurately compute the ground speed of the approaching target. The read-out derived from the ground speed computation comprises respective signals, in accordance with the speed of the approaching aircraft, which are fed to relays 17 which are selectively responsive to the read-out signals. Thus, the computer 14 may be provided with means to energize a selected relay 17 for each narrow band of a range of computed ground speeds in the same manner as the computer presents actual digital ground speed read-out information.

A shaft 47 is drivingly-coupled to a suitably-located bank of motion picture film projectors 18, namely, twenty-five projectors in the specific embodiment of the system described herein, the shaft 47 being drivingly-coupled to a cone-shaped drum 48 driven by a constant-speed electric motor 49. The shaft 47 is coupled to the drum 48 by selected idler rollers 50 rotatably-mounted on the ends of the plungers 51 of respective solenoids 52 which are selectively controlled by the relays 17, the rollers 50 being journaled on axes substantially parallel to the axes of cone 48 and shaft 47 and each being moved into engagement between shaft 47 and drum 48 responsive to the energization of the associated solenoid 52. Thus, the projectors 18 are driven at a speed in accordance with the computed aircraft ground speed, since the rollers 50 are selected responsive to the energization of the relays 17. As shown in FIGURE 6, the solenoids 52 are wired so that they are energized responsive to the energization of their associated relays 17, the energization of each solenoid 52 causing its plunger 51 to be projected to bring the associated roller into torque-transmitting engagement between cone 48 and shaft 47.

Respecting television cameras 19, corresponding in number to the number of projectors 18 are mounted to view the films contained in the respective projectors, the outputs of the cameras being connected through the contacts of respective relays 15 to the input of a suitably-located television transmitter 16. FIGURE 6 schematically shows the output conductors 53 from the television cameras 19 as being connected to a common input line 54 through the contacts 55, 56 of the respective relays. The relays 15 correspond in number to the number of approach zones defined by the rectangular areas 45 in FIGURE 4, and each relay becomes energized when the aircraft is detected in the corresponding approach zone by the read-out provided by computer 14 from the input azimuth, elevation and range information supplied to the computer by the PAR portion of the ground-controlled approach radar unit 13. Therefore, having selected a relay 15 for energization, the closure of its associated contacts 55, 56 connects the output of the corresponding television camera 19 to the television transmitter 16, whereby the transmitter 16 radiates a signal carrying the picture information contained in the film of the associated projector 18, namely, the picture information corresponding to the approach zone in which the aircraft is detected by the precision approach radar portion of the GCA unit 13. If the path of the approaching aircraft is such that it shifts from one zone to an adjacent zone, for example, if the aircraft shifts from a position shown at 60 in FIGURE 5 to a position shown at 61 as it approaches the runway 40, the change in position of the aircraft will be detected by the radar unit 13, and the resultant information fed to the computer 14 will cause the corresponding relay 15 to be energized, in accordance with the change in zonal position of the aircraft, shifting the television transmission accordingly so that the television transmitter 16 will radiate a picture corresponding to the approach zone in which the aircraft is actually traveling. Thus, in FIGURE 5, 34 designates an aircraft detected by the radar apparatus 13 along a search line 35. As shown in FIGURE 5, the aircraft may be detected in an outer approach zone located between the course lines 5 and 4 at a range of between 1½ and 2 miles from the runway 40. The path of the aircraft may correspond to the general direction of the search line 35 shown in FIGURE 5, so that the aircraft may be subsequently detected at the point 61 in another approach zone between the course lines 4 and 3 at a range of between ½ and 1 mile, as illustrated. This causes the transmitted picture to be changed in the manner above-described, giving the pilot a different view of the runway than that which he obtained when the aircraft was at the point 60.

FIGURES 7 and 8 illustrate the airborne components of the system. The aircraft is provided with a television receiver, not shown, tunable to the frequency of the television transmitter 16, and provided with a picture tube 25 of convenient size which is contained in a suitable housing conveniently located for viewing by the pilot of the aircraft. The housing is provided with the transparent front panel 20. Fixedly mounted in the housing are respective top and bottom picture tube marginal shield elements 21 and 21′, the top shield element having the horizontal bottom edge 70, and the bottom shield element 21′ having the horizontal top edge 70′, defining the respective top and bottom limits of visibility of the picture represented on the screen of the picture tube 25. Rotatably-mounted inwardly-adjacent and parallel to the transparent front cover 20 is the heading-set dial 22 provided with the heading-setting knob 23 which projects externally forwardly of the cover panel 20 and is suitably gearingly-coupled to the dial 22 so that the dial 22 may be adjusted in angular position by rotating the knob 23. Designated at 24 is a conventional remote slaved gyro heading indicator which may be similar to that employed in conventional ILS (instrument landing system) equipment, for example, "J–2" apparatus. The gyro heading indicator device 24 is provided with the heading indicator pointer 71 mounted to rotate on an axis concentric with the dial 22. As shown in FIGURE 7, the gyro heading indicator device 24 is preferably located below the picture tube 25 and arranged so that it is effective in driving the pointer 71 relative to the dial 22, which is centrally-located forwardly-adjacent the fixed bottom mask member 21′ whereby to facilitate the turning of the heading pointer toward the runway image by maneuvering the aircraft.

The picture tube 25 is supported in a mounting bracket 26 which receives and is suitably secured to the rear portion of the tube. A fork-like frame 27 receives the bracket 26 and is journaled in the rear wall 74 of the television receiver housing for rotation around an axis substantially coinciding with the axis of the picture tube 25 when the tube is in its centered position, the shaft of the frame 27 being shown at 75. Shaft 75 is driven by a servo-motor 31 in a manner presently to be described, to rotate frame 27 around the shaft axis.

The bracket member 26 is pivoted in the frame 27 on a transverse axis, shown at 76, the axis 76 being perpendicular to the shaft 75. The bracket member 26 is provided with a substantially vertically-extending arcuate rack bar 77 concentric with the transverse axis 76 which is engaged by a pinion gear 78 carried on a shaft journaled in a side portion of the frame 27 and driven by a servo-motor 30. Thus, energization of the motor 30 rotates the picture tube 25 around the transverse axis 76, whereas energization of the servo-motor 31 rotates the picture tube around the longitudinal axis of frame 27, namely, the axi. of shaft 75. The servo-motors 30 and 31 are connected by respective pairs of lead wires 32, 32 and 33, 33 to the conventional auto-pilot vertical gyro-sensing mechanism of the aircraft. The sensing mechanism determines the amount of pitch-and-roll displacement of the aircraft from its normal position and sends corresponding signals to the servo-motors 30 and 31, causing corresponding movements of the picture tube screen in the appropriate direction. The screen of the picture tube, therefore, follows the pitch-and-roll displacements of the aircraft from its normal attitude.

The servo-motors 30 and 31, in most cases, can be operated by existing auto-pilot equipment already present on an aircraft. Aircrafts not equipped with such auto-pilot equipment would require the installation of conventional gyro/sensing mechanism responding to changes in attitude of the aircraft to produce corresponding attitude changes of the picture tube.

FIGURE 8 shows a frontal view of the television receiver and associated apparatus above-described, substantially as it would be seen by the pilot of the aircraft. It will be noted that the various controls for the television receiver are provided on the front panel 20, although the main operating components of the receiver may be remotely-located in a convenient position on the aircraft, if so desired.

FIGURE 4 shows a typical lay-out of the system as employed with an airfield. FIGURE 4 shows an aircraft 80 approaching the landing runway 40 in the correct course and glide-slope paths to make a safe landing. The picture transmited by the television transmitter 16 and viewed by the pilot of the aircraft 80 will be substantially similar to the picture taken along approach path 3 and glide path 8 of FIGURES 1 and 2 and shown at 44 in FIGURE 3.

FIGURE 5 diagrammatically illustrates the method of obtaining the information necessary for programming the computer 14 in order for it to select the proper filmed approach to be transmitted by the television transmitter 16. In FIGURE 5 the horizontal-course lines are again represented by the numerals 1 to 5, as in FIGURE 1. The line 35 represents the azimuth-scanning beam of the PAR components of the ground-controlled approach radar unit. In the position of FIGURE 5 the beam is approximately 12° to the left from its mid-position. The positions 61 and 60 represent the mid-positions between the course lines 3, 4 and 5. In accordance with the above discussion it will be apparent that with the radar beam in the position illustrated in FIGURE 5, namely, along the line 35, for azimuth scanning, the proper course line film to be transmitted would be that for track 5 if the range were determined to be 1$\frac{9}{16}$ miles or greater. If the range were determined to be between 1$\frac{9}{16}$ and $\frac{7}{8}$ miles, the proper course line film selected would be that for track 4.

It will be understood, that in order for the computer to select the correct one of the five separate filmed approaches along each of the course tracks, information from the elevation beam of the PAR apparatus must be coupled with the range information in the same manner as the azimuth information, as described above.

As shown in FIGURE 8, suitable printed or otherwise inscribed information, such as positional-warning information is superimposed on the pictorial views, such information coming into view under corresponding extreme positional conditions of the aircraft. For example, in FIGURE 8, the warning "extremely high" appears on the picture to warn the pilot of the corresponding high-position condition of the aircraft when approaching along the track 11 of FIGURES 1 and 2. Other useful information relating to the approach may also be superimposed on the pictures.

The picture information may be accompanied by suitable audio information relating to the approach. The audio information may comprise wind or weather data, as in the case of conventional ground-controlled approach procedures. The visual instructions may be in any suitable language or in multiple languages, for example, the instructions may be in English and may be accompanied by corresponding translation into one or more foreign languages.

The audio and/or visual lettered information may be in any desired language and may be selected by any suitable means, for example, by a switch under the control of the traffic approach-control operator of the airfield concerned, thus enabling the operator to select the native language of the pilot making the approach, and thereby, minimizing possible confusion in interpreting the instructions or warning information.

When not triggered to provide approach transmission, the television transmitter 16 may transmit normal selected picture for receiver tuning and a sound track providing pertinent information, such as weather conditions at the airfield, or the like. The transmitter may be designed to transmit on two frequencies for this purpose, if desired; that is, additional equipment for two or more channels may be incorporated in the transmitter.

The films employed in the projectors 18 are preferably of the endless-loop type so that when an aircraft completes an approach and the films have reached their end, the beginnings of the films would be in place, ready for the next aircraft to use the system.

The computer-programming circuits preferably contain self-interrogation circuitry to prevent the system from becoming confused if a second target enters the radar-coverage range, namely, range information on each antenna scan (approximately each ½ second) would be compared to the information obtained on the previous scan, and if the difference were in excess of the distance that an aircraft could travel in the corresponding time period, the return from the new target would be disregarded.

Although the system has been described above and illustrated as employing motion pictures and motion picture film strips, it will be readily apparent that still pictures may be employed in place of the moving pictures, the still pictures showing the various views of the runway 40 as they appear in the different segments of the approach zone.

It will be readily understood that the system is triggered into operation when the radar apparatus 13 detects the aircraft 80 at the entry to the approach zone, namely, substantially in the area enclosed by the rectangle 42 in FIGURE 4. The triggering action takes place in the computer 14 responsive to the previously programmed combination of range, azimuth and elevation information factors corresponding to the presence of the aircraft in or relatively closely-adjacent to rectangle 42.

While a specific embodiment of a simulated visual instrument-approach system for aircraft has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A simulated visual instrument-approach system for aircraft entering the approach zone leading to the runway of an airfield comprising approach-radar means at the airfield to detect the aircraft and to derive azimuth, elevation and range information, a television transmitter at the airfield, a plurality of pictures of the airfield, each taken from one of the various segments of the approach zone, means to select the pictures in accordance with the detected azimuth, elevation and range information, means to furnish video signals corresponding to the selected pictures to the input of the transmitter for transmission thereby, and television-receiver means on the aircraft for reproducing the transmitted pictures.

2. A simulated visual instrument-approach system for aircraft entering the approach zone leading to the runway of an airfield comprising approach-radar means at the airfield to detect the aircraft and to derive azimuth, elevation and range information and including a periodic scanning antenna, whereby ground speed information of the aircraft is derived from successive scanning cycles of the antenna, a television transmitter at the airfield, a source of motion pictures of the airfield taken in various segments of the approach zone, respective projection means for the motion pictures, means to vary the speed of the projection means in accordance with said ground speed information, means to selectively furnish video signals corresponding to the pictures from the projection means to the input of the transmitter in accordance with the detected azimuth, elevation and range information, and television-receiver means on the aircraft for reproducing the transmitted pictures.

3. A simulated visual instrument-approach system for aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, and television-receiver means on the aircraft for reproducing the transmitted pictures.

4. A simulated visual instrument-approach system for aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, and means to vary the speed of the projectors in accordance with the ground speed of the aircraft.

5. A simulated visual instrument-approach system for aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, said television receiver means including a picture tube, means movably-supporting said picture tube in the aircraft, and means to vary the orientation of the picture tube with changes in attitude of the aircraft.

6. A simulated visual instrument-approach system for an aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, means to vary the speed of the projectors in accordance with the ground speed of the aircraft, said television-receiver means including a picture tube, means movably-supporting said picture tube in the aircraft, and means to vary the orientation of the picture tube with changes in attitude of the aircraft.

7. A simulated visual instrument-approach system for an aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, said television-receiver means including a picture tube, masking means fixed relative to the aircraft at the margin of the screen of the picture tube and normally partially covering said screen, means movably-supporting said picture tube on the aircraft so that the screen is movable relative to said masking means, and means to vary the orientation of the picture tube with changes in attitude of the aircraft.

8. A simulated visual instrument-approach system for an aircraft entering the approach zone leading to the runway of an airfield comprising approach-radar means at the airfield to detect the aircraft and to determine its azimuth, elevation and range, a television transmitter at the airfield, a plurality of motion picture projectors corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, said television-receiver means including a picture tube, masking means fixed relative to the aircraft at the margin of the screen of the picture tube and normally partially covering said screen, means supporting the picture tube on the aircraft for rotation around its axis, additional means supporting the picture tube for rotation around a second axis substantially perpendicular to its own axis, whereby the screen is movable relative to said masking means, and means to vary the orientation of the picture tube with changes in attitude of the aircraft.

9. A simulated visual instrument-approach system for an aircraft entering the approach zone leading to the runway of an airfield comprising approach-radar means at the airfield to detect the aircraft and to determine its azimuth, elevation and range, a television transmitter at the airfield, a plurality of motion picture projectors, corresponding to respective segments of the approach zone, respective motion picture films in the projectors, said films representing the airfield as viewed under clear lighting conditions in the respective segments, respective video camera means exposed to the projectors, means to selectively connect the camera means to the input of the transmitter in accordance with the azimuth and elevation of the detected aircraft as determined by said radar means, television-receiver means on the aircraft for reproducing the transmitted pictures, means to vary the speed of the projectors in accordance with the ground speed of the aircraft, said television-receiver means including a picture tube, masking means fixed relative to the aircraft at the margin of the screen of the picture tube and normally partially covering said screen, means supporting the picture tube on the aircraft for rotation around its axis, additional means supporting the picture tube for rotation around a second axis substantially perpendicular to its own axis, whereby the screen is movable relative to said masking means, and means to vary the orientation of the picture tube with changes in attitude of the aircraft.

10. A simulated visual instrument-approach system for an aircraft entering the approach zone leading to the runway of an airfield, said approach zone being divided into a plurality of horizontally-spaced rows of sectors each comprising a plurality of vertically-spaced sectors, approach-radar means at the airfield to detect the aircraft and to determine the sector containing the aircraft, a television transmitter in the region of the airfield, a plurality of pictures of the airfield, each taken from one of the respective sectors, means to select the picture corresponding to the sector containing the aircraft, means to furnish video signals corresponding to the selected picture to the input of the transmitter, and a television receiver on the aircraft for receiving and reproducing the transmitted pictures.

11. A simulated visual instrument-approach system for an aircraft entering the approach zone leading to the runway of an airfield, said approach zone being divided into a plurality of side-by-side horizontally-spaced rows of sectors each comprising a purality of vertically-spaced sectors, approach-radar means at the airfield to detect the aircraft and to determine the azimuth, elevation and range of the aircraft, a television transmitter in the region of the airfield, a source of pictures of the airfield taken in the respective sectors under clear lighting conditions, respective projectors associated with the sectors and containing the respective pictures, respective video pick-up means viewing the pictures in the projectors, means to compute the speed of the aircraft from the change in range thereof as it moves through the approach zone, means to vary the speed of the projectors in accordance with the computed speed of the aircraft, means to selectively connect the video pick-up means to the input of the transmitter in accordance with the detected azimuth and elevation of the aircraft, and a television receiver on the aircraft for receiving and reproducing the transmitted pictures.

12. The system of claim 11, wherein the television receiver includes a picture tube having a viewing screen, and means to change the orientation of the picture tube in accordance with changes in attitude of the aircraft.

13. The system of claim 12, and a mask fixed relative to the aircraft and overlying the margins of the viewing screen.

14. The system of claim 13, and a rotatable heading indicator mounted adjacent the viewing screen.

15. The system of claim 11, wherein the television receiver includes a picture tube having a viewing screen, a transparent panel fixedly-mounted on the aircraft in front of the picture tube, opaque masking means fixedly-mounted behind the panel and overlying the margins of the viewing screen, means to change the orientation of the picture tube in accordance with the changes in attitude of the aircraft, a rotatable heading dial mounted parallel to and behind the panel subjacent the central portion of the viewing screen, a heading-indicating pointer rotatably-mounted concentrically with the dial, and means to rotate the pointer responsive to changes in heading of the aircraft.

16. The system of claim 13, and wherein the pictures include verbal visual data superimposed thereon.

17. A simulated visual instrument-approach system for an aircraft entering the approach zone leading to the runway of an airfield, said approach zone being divded into a plurality of side-by-side horizontally-spaced vertical rows of sectors, approach-radar means at the airfield to detect the aircraft and to determine the azimuth, elevation and range of the aircraft, a television transmitter in the region of the airfield, a source of motion pictures of the airfield taken in the respective sectors under clear lighting conditions, respective projectors associated with the sectors and containing the respective motion pictures, respective video pick-up means viewing the pictures in the projectors, means to compute the speed of the aircraft from the change in range thereof as it moves through the approach zone, constant-speed motor-drive means, a variable-speed transmission connecting said motor-drive means to the projectors, means to operate said variable-speed transmission to vary the speed of the projectors in accordance with the computed speed of the aircraft, means to selectively connect the video pick-up means to the input of the transmitter in accordance with the detected azimuth and elevation of the aircraft, and a television receiver on the aircraft for receiving and reproducing the transmitted pictures.

18. The system of claim 17, and wherein said transmission includes a shaft drivingly-connected to the projectors, a conical driving drum driven by the motor drive means and mounted so that its surface is substantially parallel to the shaft, a plurality of solenoids mounted adjacent said shaft and driving drum transverse thereto, said solenoids having movable plungers provided with idler rollers journaled thereon and drivingly-engageable between the shaft and the conical driving drum responsive to energization of the solenoids, and wherein the means to operate the transmission comprises means to selectively energize said solenoids in accordance with the computed speed of the aircraft.

References Cited

UNITED STATES PATENTS

| | | |
|---|---|---|
| 2,490,268 | 12/1949 | Herbst. |
| 2,959,779 | 11/1960 | Miller. |
| 3,178,704 | 4/1965 | Moore _____ 343—6 |
| 3,195,125 | 7/1965 | Reitler. |

ROBERT L. GRIFFIN, *Primary Examiner.*

J. A. ORSINO, *Assistant Examiner.*

U.S. Cl. X.R.

35—12; 178—6; 343—6